United States Patent [19]

Hart et al.

[11] Patent Number: 4,916,745
[45] Date of Patent: Apr. 10, 1990

[54] BAYESIAN IMAGE PROCESSING METHOD AND APPARATUS

[76] Inventors: Hiram E. Hart, 3400 Wayne Ave.; Zhengrong Liang, 44 E. 208th St., both of Bronx, N.Y. 10467

[21] Appl. No.: 827,253

[22] Filed: Feb. 7, 1986

[51] Int. Cl.⁴ .............................................. G06K 9/00
[52] U.S. Cl. ................... 382/6; 364/413.13; 382/39
[58] Field of Search ............... 382/6, 39, 54; 364/414

[56] References Cited

U.S. PATENT DOCUMENTS

| | | | |
|---|---|---|---|
| 3,839,702 | 10/1974 | Chaires | 382/39 |
| 3,842,402 | 10/1974 | Ett | 382/39 |
| 3,997,774 | 12/1976 | Schlaepfer | 382/54 |
| 4,090,243 | 5/1978 | Kotera | 364/554 |
| 4,191,940 | 3/1980 | Polcyn | 382/6 |
| 4,315,318 | 2/1982 | Kato | 382/54 |
| 4,335,427 | 6/1982 | Hunt | 382/54 |
| 4,438,495 | 3/1984 | Collins | 382/54 |
| 4,504,908 | 3/1985 | Riederer | 364/414 |

Primary Examiner—Leo H. Boudreau
Assistant Examiner—Joseph Mancuso
Attorney, Agent, or Firm—Kirschstein, Ottinger, Israel & Schiffmiller

[57] ABSTRACT

A Bayesian image processing method and apparatus take into account supplementary source information previously ignored by most likely source distribution techniques and produce highly accurate results.

4 Claims, 9 Drawing Sheets

BAYESIAN IMAGE PROCESSING METHOD AND APPARATUS

BACKGROUND OF THE INVENTION

1. Field of the Invention

This invention relates to the improved determination of the distribution and intensity of signal sources of initially imprecisely specified spatial amplitude and/or temporal characteristics in the presence of noise and distortion by means of appropriate measurement and analysis.

2. Description of the Prior Art

In many communication applications it is desired to extract information of known frequency, phase, or repetitive characteristics from a noisy signal. Many techniques have been developed to successfully discriminate against essentially random noise and so dramatically improve the signal to noise ratio. In radioisotope measurements and many other applications, however, the signal is itself intrinsically randomly fluctuating, and many of the communications techniques are not immediately applicable. Furthermore in, for example, radioisotopic organ scans the information desired is typically three-dimensional (four-dimensional if time-dependent dynamic functions are being studied), while the measured outputs are often only two-dimensional scans. Specialized equipment and methods of data analysis have therefore been developed in the field of radioisotopic medical imaging, such as described in "Radionuclide Section Scanning," by Ell et al, Grune & Stratton (1982). Radioisotope tissue distributions have been determined using positron emission coincidence techniques. These methods are currently limited as to the organ scanned, the available positron emitting isotopes and require specialized equipment usually with either $2\pi$ planar or $\approx 4\pi$ solid angle geometries. Attempts have also been made to reconstruct three-dimensional radioisotopic tissue distributions by acquiring two-dimensional signal gamma scan data at different angles of projection and carrying out a three-dimensional reconstruction by projective techniques, such as described in "Image Reconstruction From Projections," by Herman (1980, Academic Press). Here, too, specialized equipment usually with $2\pi$ planar or $\approx 4\pi$ solid angle geometries were employed.

In general, the mathematical difficulties associated with a formal linear algebraic approach to the problem of determining the three-dimensional tissue distributions from measured data are very formidable. Formal solutions would not only involve inversion of a series of relatively large three-dimensional point source response matrices, but the utilization of noisy data appropriately weighted in accordance with overall statistical optimization constraints. In view of these difficulties, it has been customary instead to use various iterative approximation techniques, generally making use of projective data at multiple angles of orientation. (It should be noted, however, that if the point source response is itself sufficiently depth dependent, there is, in principle, no a priori requirement that multiple projections be taken.)

These iterative approximation techniques have been variably successful in extracting the true source distribution from the convoluted noisy data. Recently an approach has been developed by Shepp and Vardi (1982, IEEE Tran. Medical Imaging), and Lange and Carson (1984, J. Comput. Ass. Tomography) which makes use of modern statistical methodology to derive algorithms which under certain conditions serve to formally specify those source distributions which are probabilistically most likely, considering the measured data, the statistical distributions satisfied by the data (e.g. Poisson distribution, or Gauss distribution) and the known point source response function (PSRF, distortion characteristics of the equipment and measuring process). Excellent solutions are achieved if the PSRF are sharp implying relatively little distortion to begin with and in the presence of minimal noise. However, these maximum likelihood algorithms (ML) do not in general give accurate results when the PSRF is broad and the data is noisy. Since a broad PSRF implies a low resolution detection system and noisy data is necessarily inherently less reliable, the limitations in solution specificity would appear to be inherent and the above approaches therefore still optimal.

Nonetheless in certain situations of very basic importance, a further major improvement in image processing can be achieved.

Consider a situation, for example, in which while the spatial distribution of the source distribution is relatively unknown, the radioisotope concentration of the individual source elements is readily estimated. This occurs, for example, in cardiac imaging immediately following I.V. administration of a radioisotopic dose. The blood concentration curves can be relatively well measured or otherwise estimated over the next few minutes while the cardiac muscle will be comparatively free of isotope.

The prior ML algorithms in specifying solutions which do not take into account such source information are, therefore, not actually extracting the general maximum likelihood result (i.e. that maximum likelihood source distribution considering all of the available information).

It follows then that there has not been a generally effective method for extracting the most probable source distribution which takes into account all of the information which may be available.

These observations can be expressed more precisely in terms of the standard statistical relation. Bayes' Law:

$$P(\Phi|N) = P(N|\Phi)P(\Phi)/P(N) \qquad (1)$$

where:
- $P(\Phi|N)$ is the conditional probability of the source vector $\Phi$ subject to the data vector N;
- $P(N|\Phi)$ is the conditional probability of the data vector N subject to the source vector $\Phi$;
- $P(\Phi)$ is the probability distribution of the source vector $\Phi$ (assumed competely unknown or constant in the Shepp and Vardi, and Lange and Carson maximum likelihood formulations but not in the new Bayesian formalism); and
- $P(N)$ is the probability distribution of the data vector N (treated as a constant in all methods).

When $P(\Phi)$ and $P(N)$ are assumed constant, $P(\Phi|N)$ and $P(N|\Phi)$ are of course linearly proportional. Maximizing $P(N|\Phi)$ (which is the approach previously taken) is then equivalent to maximizing $P(\Phi|N)$. In the new Bayesian formalism, however, any non-trivial a priori source information is first incorporated in $P(\Phi)$ and the more logical direct maximization of $P(\Phi|N)$ carried out, taking into account, of course, the now non-constant $P(\Phi)$ on the right side of Eq.(1).

SUMMARY OF THE INVENTION

1. Objects of the Invention

It is the general object of this invention to effectively obtain the most probable source distribution which takes into account all of the available information and, more particularly, which takes into account supplementary source information hitherto ignored.

It is another object of this invention to more accurately extract the most probable source distribution than that previously obtained by the known maximum likelihood algorithm.

2. Features of the Invention

In keeping with these objects, and others which will become apparent hereinafter, one feature of this invention resides, briefly stated, in a method of and an apparatus for acquiring and processing data arising from a source. In accordance with this invention, a measuring system is used to obtain the source data. The response characteristics of the measuring system are also determined. Supplementary source information concerning the source is also determined. The most likely source distribution which would give rise to the measured source data is algebraically specified using not only the measured source data and the response characteristics of the measuring system, as was done previously with prior art techniques, but also by using the supplementary source information. Finally, the most likely source distribution is calculated from the algebraic specification.

By taking into account the supplementary source information which was hitherto ignored, this invention uses all of the available information and, as a result, more accurately obtains the most probable source distribution.

Another feature of this invention resides in iteratively performing the calculating step and, more particularly, by using an algorithm derived from the estimation-maximization formalism. Also, it is advantageous if the calculating step includes gradually increasing the relative importance of the supplementary source information by adjusting a parameter.

The supplementary source information may be a source pattern or patterns whose possible presence at the source is under evaluation. The supplementary source information generally consists of source probability functions in spatial, temporal and/or source strength variables.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENT

Figure 1:
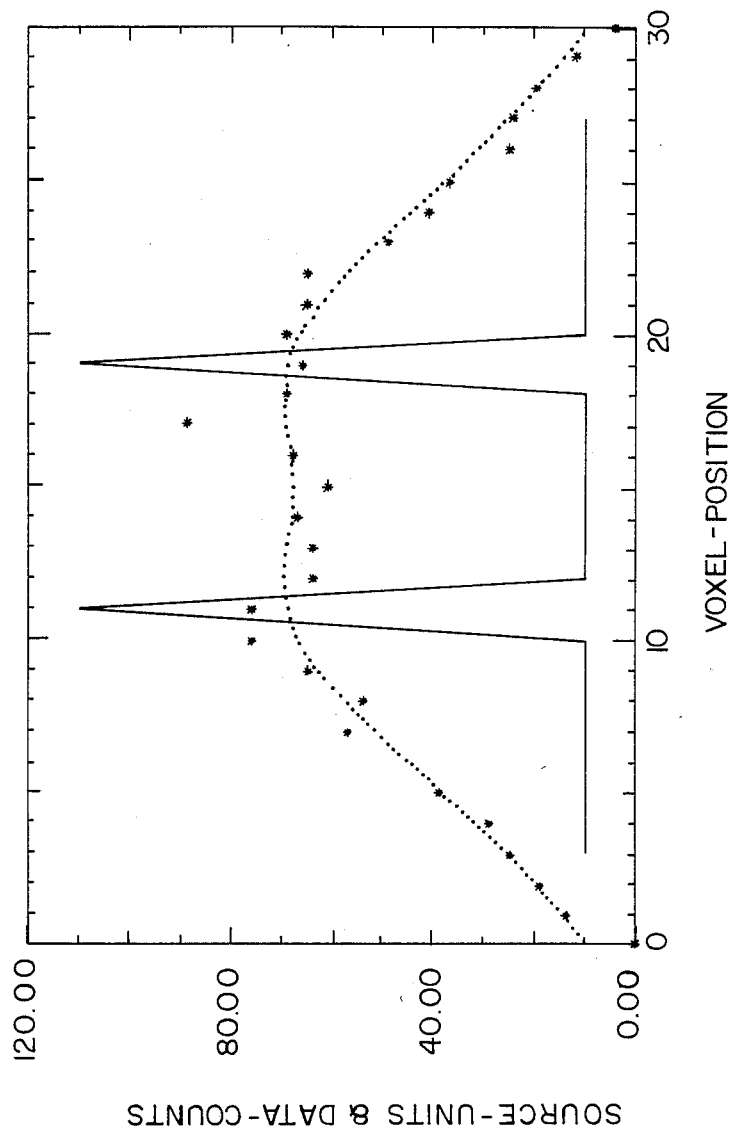
FIG. 1 is a graph depicting the true source distribution in solid lines, the exact (ideal) data in dotted lines, and a single set of Poisson randomized data denoted by asterisks.

The above-cited limitations of the prior art can now be substantially reduced with a Bayesian image processing (BIP) formalism based upon identifying the source information $P(\Phi)$ and then maximizing $P(\Phi|N)$ instead of simply maximizing $$P(N|\Phi) = \prod_i^W (e^{-\Sigma_j r_{ij}\phi_j}) \frac{\left(\sum_j R_{ij}\phi_j\right)^{N_i}}{N_i!} \qquad (2)$$

assuming $P(\Phi)$ constant; where the assumption that each element of the measured data $N=\{N_i\}$ is an independent Poisson random variable has been used, W is the number of measured data elements and the convolution of PSRF (expressed in matrix form with elements $R_{ij}$) with $\Phi=\{\phi_j\}$ gives the means of the random variables $\{N_i\}$ respectively.

Depending upon the nature of the source probability distribution $P(\Phi)$, the resulting algorithms will be variously modified.

The derivation of typical BIP algorithms will now be outlined for simple examples:

Assume it is known that the elements of the source vector $\Phi$ can have only two possible values $\phi_b$ (i.e. the background value) and $\phi_a$ and that the value of each source element $\phi_j$ is independent of all other elements, then theoretically:

$$P(\Phi) = \pi P_j(\phi_j) = \pi \left[ \frac{U}{V} \delta(\phi_j - \phi_a) + \frac{V-U}{V} \delta(\phi_j - \phi_b) \right] \quad (2)$$

where V is the number of source elements, U/V the probability of $\phi_j$ having the value $\phi_a$ and $\delta$ the usual delta function.

Clearly each probability distribution $P_j(\phi_j)$ is the same bi-modal sum of the two $\delta$ functions

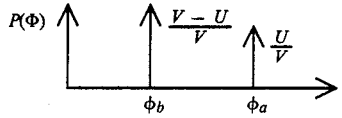

having two peaks, one at $\phi_b$ and one at $\phi_a$.

It is algebraically and computationally convenient (but in general not essential) to approximate $P(\Phi)$ by another equi-amplitude bi-modal function:

$$P(\Phi) = \pi C_j e^{-\frac{(\phi_j - \phi_b)^2}{2\sigma b^2} \frac{(\phi_j - \phi_a)^2}{2\sigma a^2}} \quad (3)$$

where $C_j$ is the normalization constant.

From Eqs.(1), (2) and (3), $$g(\Phi|N) = \ln P(\Phi|N) \quad (4)$$

$$= \sum_i \left[ -\sum_j R_{ij}\phi_j + \ln\left(\sum_j R_{ij}\phi_j\right) - \ln(N_i!) \right]$$

$$- \sum_j \left[ \frac{(\phi_j - \phi_b)^2}{2\sigma_b^2} \frac{(\phi_j - \phi_a)^2}{2\sigma_a^2} - \ln C_j \right]$$

The first parenthesis on the right hand side of Eq.(4) represents the standard approach; the additional quadratic terms arise from the a priori source information $P(\Phi)$ assumption.

The Bayesian maximum likelihood equations algebraically specifying the BIP solution $\Phi^*$ arise by setting $$\frac{\partial g(\Phi|N)}{\partial \phi_k} = 0$$

and become:

$$\sum_i R_{ik} \left[ \frac{N_i}{\sum_j R_{ij}\phi^*_j} - 1 \right] = Z^*_{kb} Z^*_{ka} \frac{(Z^*_{kb} + Z^*_{ka})}{2\sigma_b^2 \sigma_a^2} \quad (5)$$

where $$Z_{kb}^* = \phi_k^* - \phi_b \text{ and } Z_{ka}^* = \phi_k^* - \phi_a$$

The right hand side of Eq.(5) is, of course, just the Bayesian term.

The standard EM technique (Dempster et al, 1977, J. Royal Stat. Soc.) can then be used to derive an appropriate iterative algorithm $$\phi_k^{(n+1)} = \phi_k^{(n)} \frac{\sum_i R_{ik}\left(n_i / \sum_j R_{ij}\phi_j^{(n)}\right)}{\sum_i R_{ik} + \mu_k^{(n)}[Z_{kb}^{(n)}Z_{ka}^{(n)}(Z_{kb}^{(n)}Z_{ka}^{(n)} + Z_{ka}^{(n)})/(2\sigma_b^2\sigma_a^2)]} \quad (6)$$

with $$Z_{kb}^{(n)} = \phi_k^{(n)} + \tau d_k^{(n)} - \phi_b$$
$$Z_{ka}^{(n)} = \phi_k^{(n)} + \tau d_k^{(n)} - \phi_a$$

and $$d_k^{(n)} = \phi_k^{(n)} - \phi_k^{(n-1)}$$

where $\tau$ is a factor of order one and $\mu_k^{(n)}$ an adjustable parameter $> 0$.

The adjustable parameter employed is intended to gradually introduce the Bayesian improvement in the non-Bayesian (ML) approach and the dependence is of the general form:

$$\mu_k^{(n)} = \frac{A n^\epsilon}{B + n^\epsilon} \sum_i R_{ik}$$

where n is the iterative index.

The choice of A, B and $\epsilon$ is not critical. Typical values used were $\epsilon \approx 2$, $A \approx 5$ and $B \approx 200$.

For the more general case of unpatterned source distributions in which the source elements can assume the $\alpha + 1$ values, $\phi_b, \phi_s = \phi_1, \phi_2, \ldots, \phi_\alpha$, $$P_1(\Phi) = \pi C_j e^{-\frac{(\phi_j - \phi_b)^2}{2\sigma b^2} \frac{\pi}{s} \frac{(\phi_j - \phi_s)^2}{2\sigma s^2}} \quad (7)$$

the iterative algorithm is $$\phi_k^{(n+1)} = \phi_k^{(n)} \frac{\sum_i R_{ik}\left(N_i / \sum_j R_{ij}\phi_j^{(n)}\right)}{\sum_i R_{ik} + \mu_k^{(n)} X_k^{(n)}} \quad (8)$$

where $$X_i^{(n)} = -\frac{\partial}{\partial \phi_i} \{\ln P_1(\Phi)\}|_{\Phi = \Phi(n) + \tau dk}$$

If the source information implies the possible presence of a particular pattern, $$P_2(\Phi) = \pi C_j e^{-\frac{(\phi_j - \phi_b)^2}{2\sigma b^2} \frac{\pi}{q} \left[ \frac{\beta}{r} \frac{(\phi_j + h - \phi_t)^2}{2\sigma t^2} \right]} \quad (9)$$

then, the iterative algorithm is $$\phi_k^{(n+1)} = \phi_k^{(n)} \frac{\sum_i R_{ik}\left(N_i / \sum_j R_{ij}\phi_j^{(n)}\right)}{\sum_i R_{ik} + v_k^{(n)} Y_k^{(n)}} \quad (10)$$

and $$\gamma_k^{(n)} = -\frac{\partial}{\partial \phi_k}\{\ln P_2(\Phi)\}|_{\Phi=\Phi(n)+\tau dk} \quad (11)$$

where $\beta$ is the number of elements of the pattern, the index lt represents the spatial relations of the pattern elements and q covers the possible pattern configurations. The adjustable parameter $\nu_k^{(n)}$ serves the same purpose as $\mu_k^{(n)}$.

If the presence of more than one type of pattern is indicated, $$P_3(\Phi) = \sum_k^{\gamma} \left\{ \pi C_{jk} e^{-\frac{(\phi_{jk}-\phi_b)^2}{2\sigma_b^2}} \frac{\pi}{q}\left[\sum_t \frac{(\phi_{jk}+k lt-\phi_{kt})^2}{2\sigma_{kt}^2}\right]\right\} \quad (12)$$

where the index $\gamma$ represents the different patterns, the resulting iterative algorithm has the same forms as Eqs.(10) and (11).

The BIP method readily accommodates a priori source information which is less specific (i.e. fuzzy patterns). Typical source probability functions of the form $$P_4(\Phi) = \quad (13)$$

$$\pi\left(\frac{1}{Q}\sum_q\left[\pi C_s e - \sum_l \frac{(\phi_{j+1}-\phi_s)^2}{2\sigma_s^2} W(j)\right] + C_b e^{-\frac{(\phi_j-\phi_b)^2}{2\sigma_b^2}}\right)$$

would then be applicable and the resulting iterative algorithm is similar to Eqs.(10) and (11).

The weighting function W(l) in Eq.(13) reflects variation of the spatial relations of the pattern elements. P(Φ) representing other types of a priori source probability distributions reflecting entropy, continuity, and range constraints on the permissible source solutions can also be readily incorporated in this Bayesian image processing method.

RESULTS

Turning now to the drawings to illustrate the comarative results obtained using the algorithms (9) and (10) which can be processed by a general purpose computer in accordance with the BIP method of this invention contrasted with the ML method of the prior art, attention is first drawn to FIG. 1 wherein an example of a true source distribution is depicted in solid lines. This distribution consists of a first point source of strength 110 units at position 11, a second point source of strength 110 units at position 19, and a uniform background at all other positions of a strength 10 units. The exact (ideal) data obtained from a measuring system and corresponding to the true source distribution is depicted in dotted lines. Also a single set of Poisson randomized data is plotted with asterisks.

Figure 2:
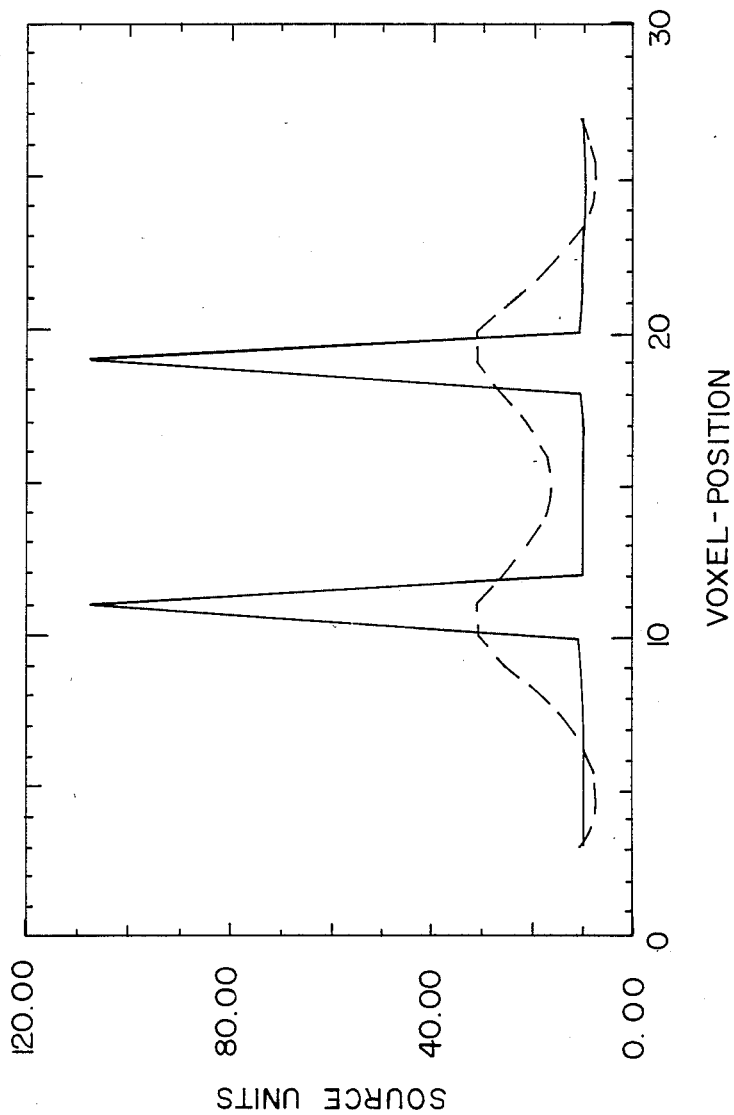
FIG. 2 is a graph depicting the results according to the present invention in solid lines for the ideal data of FIG. 1 after 100 iterations, and the results according to the ML technique of the prior art in dashed lines for the same ideal data of FIG. 1 after 100 iterations.

If one were to use the prior art ML method, the results for the ideal data of FIG. 1 are shown in FIG. 2 in dashed lines, whereas the corresponding BIP results after 100 iterations with $\phi_b=10$ and $\phi_a=110$ are shown in solid lines. It will be readily appreciated that the BIP results more closely, if not exactly, duplicate the true source distribution of FIG. 1 and, hence, are more accurate.

Figure 3:
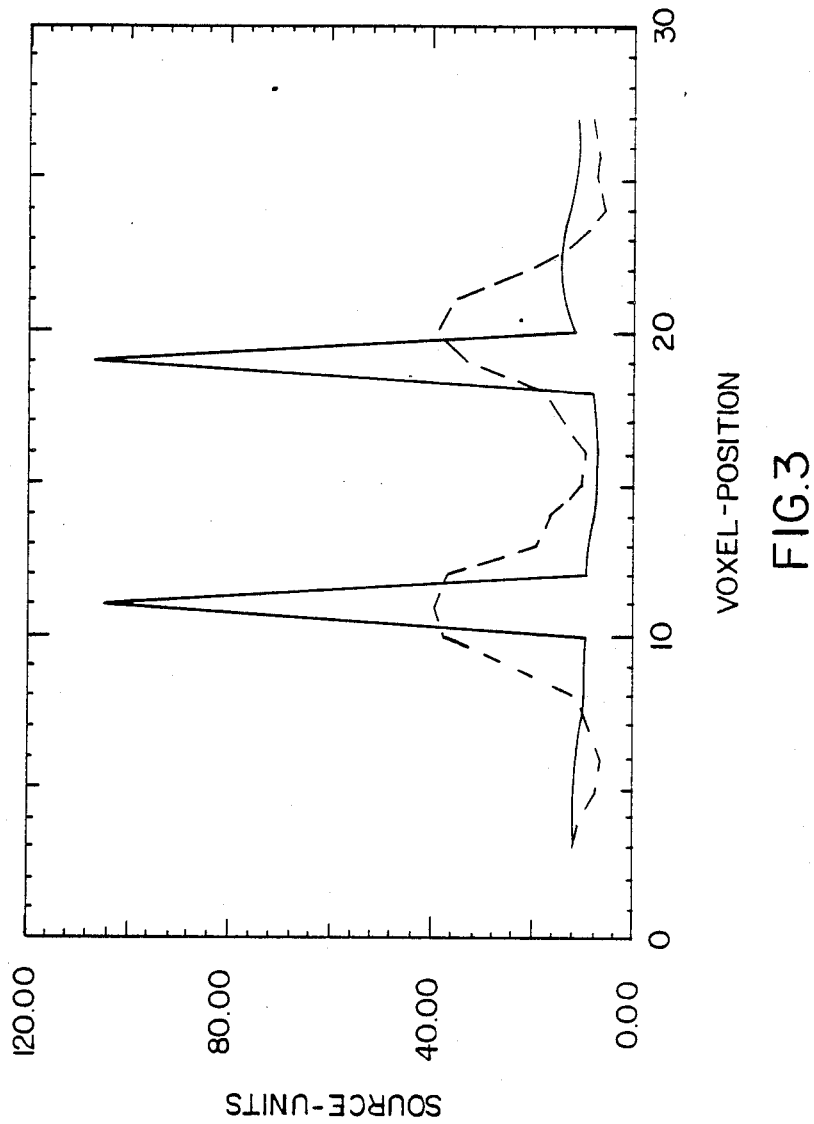
FIG. 3 is a graph depicting the results according to the present invention in solid lines for the single set of Poisson randomized data of FIG. 1, and the corresponding results according to the ML technique of the prior art in dashed lines for the same single set of Poisson randomized data.

The same is true for the single set of Poisson randomized data of FIG. 1 whose results are shown in FIG. 3 in dashed lines for the ML method, and in solid lines for the BIP method. Again, the BIP results are more accurate.

Figure 4:
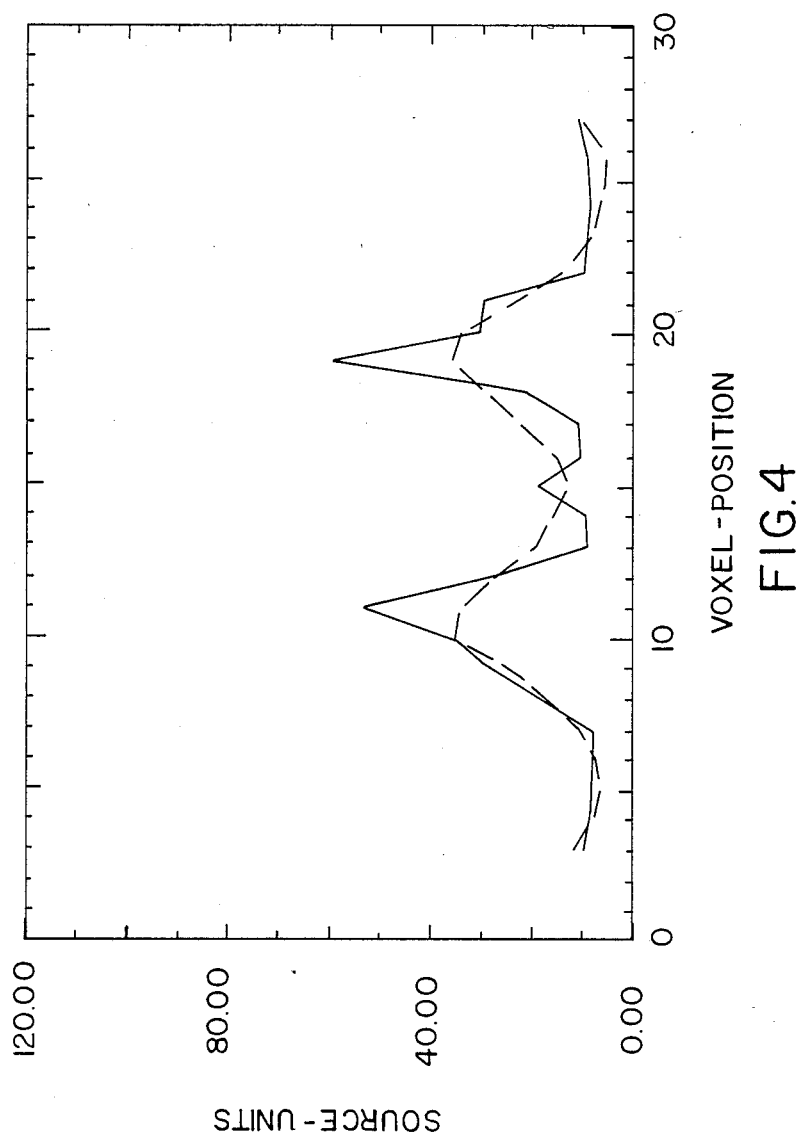
FIG. 4 is a graph depicting the results according to the present invention in solid lines for the average of ten sets of the poisson randomized data, and the corresponding results according to the ML technique of the prior art in dashed lines after the same ten sets of Poisson randomized data of FIG. 1.

Turning to FIG. 4, the average results for ten sets of the Poisson randomized data of FIG. 1 are shown for the ML method in dashed lines, and the corresponding BIP results are shown in solid lines. Again, the BIP results are more accurate.

Figure 5:
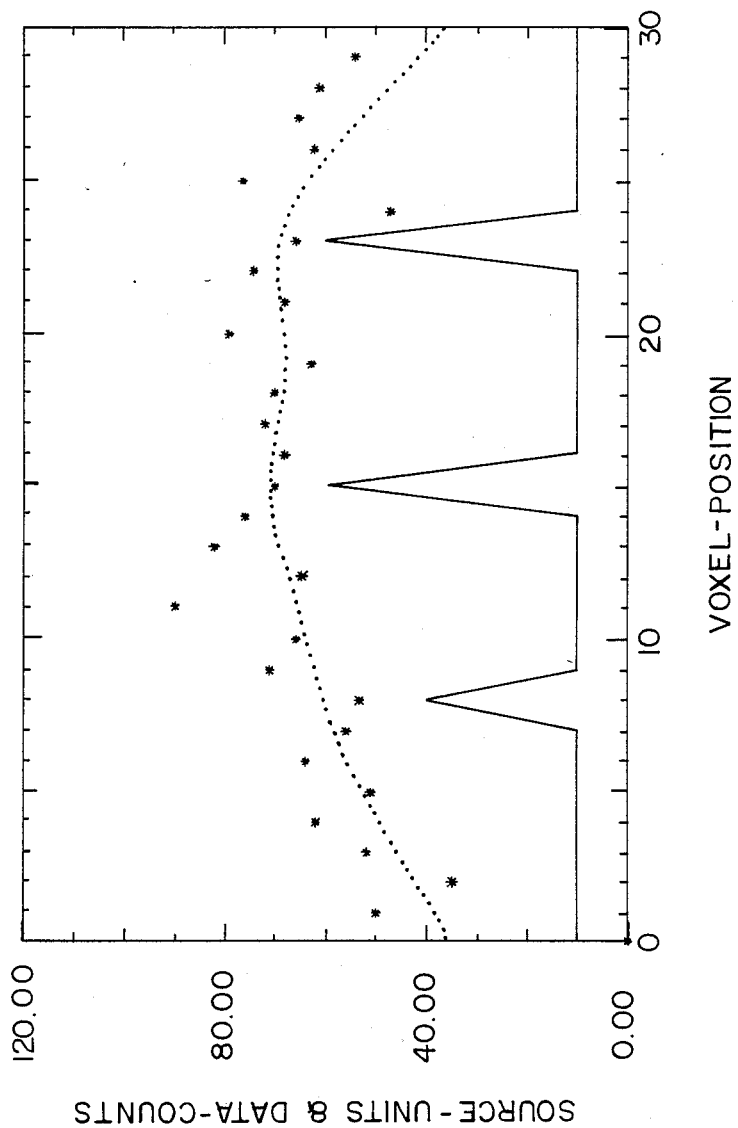
FIG. 5 is a graph depicting a patterned source distribution in solid lines, the exact (ideal) data in dotted lines, and a single set of Poisson randomized data characterized by asterisks.

Attention is next drawn to FIG. 5, which shows another example of a true source distribution depicted in solid lines and, this time, the source distribution has a specific pattern wherein the point sources are spaced differently apart and are of different strengths. For example, the illustrated source distribution pattern consists of a first point source of strength 40 units at position 8, a second point source of strength 60 at position 15, a third point source of strength 60 at position 23, and a uniform background at all other positions of a strength 10 units. The exact (ideal) data obtained from a measuring system and corresponding to the true source distribution is depicted in dotted lines. Also, a single set of Poisson randomized data is plotted with asterisks.

Figure 6:
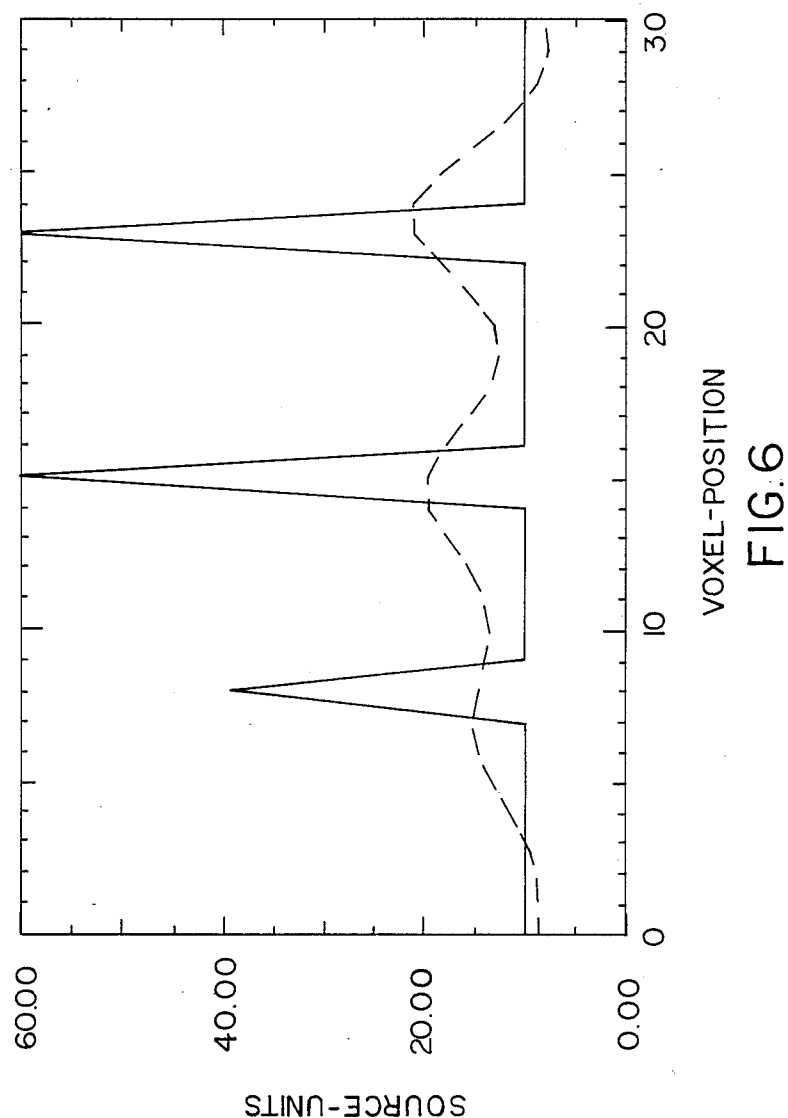
FIG. 6 is a graph depicting the results according to the present invention in solid lines for the ideal data of FIG. 5 after 100 iterations, and the corresponding results according to the ML technique of the prior art in dashed lines for the same ideal data after 100 iterations.

If one were to use the prior art ML method, the results for the ideal data of FIG. 5 are shown in FIG. 6 in dashed lines, whereas the corresponding BIP results after 100 iterations are shown in solid lines. It will be readily appreciated that the BIP results more closely, if not exactly, duplicate the true source distribution of FIG. 5 and, hence, are more accurate.

Figure 7:
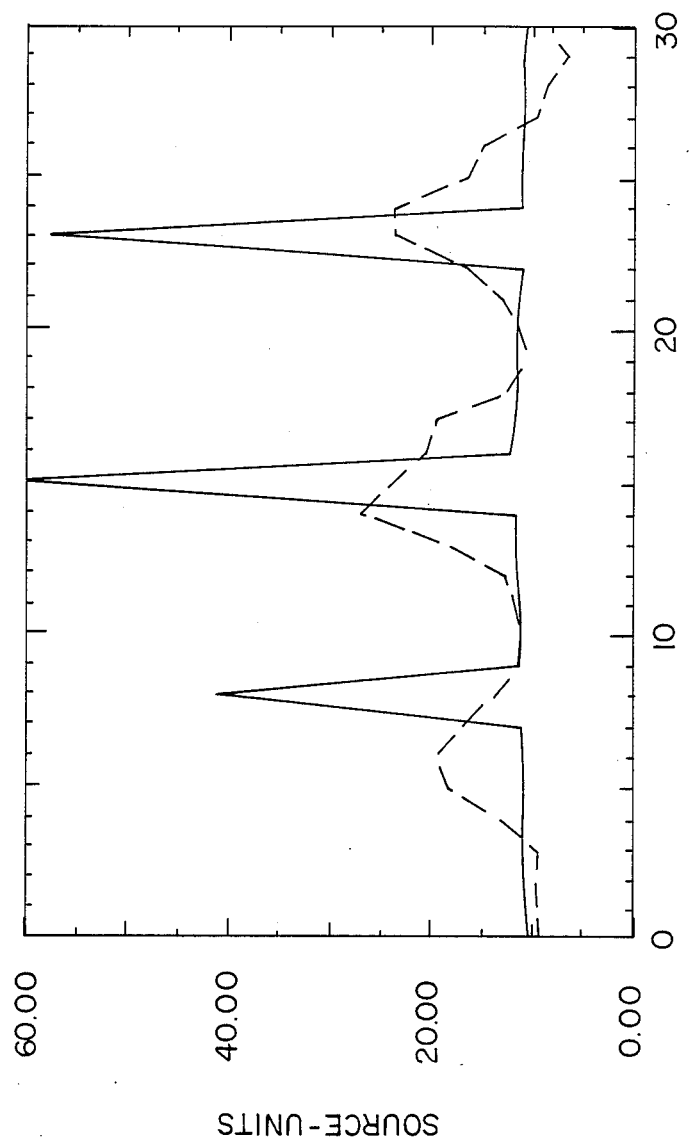
FIG. 7 is a graph depicting the results according to the present invention in solid lines for the single set of Poisson randomized data of FIG. 5, and the corresponding results according to the ML technique of the prior art in dashed lines for the same single set of Poisson randomized data.

The same is true for the single set of Poisson randomized data of FIG. 5 whose results are shown in FIG. 7 in dashed lines for the ML method, and in solid lines for the BIP method. Again, the BIP results are more accurate.

Figure 8:
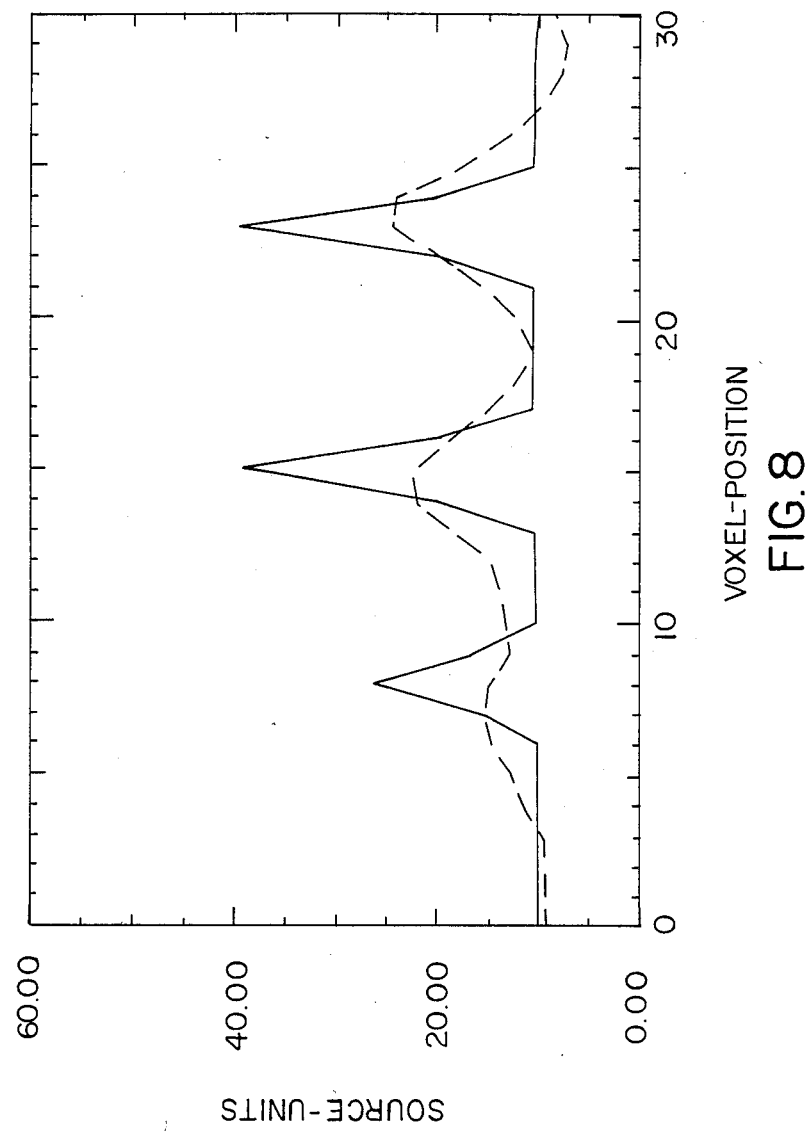
FIG. 8 is a graph depicting the results according to the present invention in solid lines for the average of ten sets of the Poisson randomized data, and the corresponding results according to the ML technique of the prior art in dashed lines for the same ten sets of Poisson randomized data of FIG. 5

Turning to FIG. 8, the average results for ten sets of the Poisson randomized data of FIG. 5 are shown for the ML method in dashed lines, and the corresponding BIP results are shown in solid lines. Again, the BIP results are more accurate.

It will be understood that the method described above also may find a useful application in fields other than radioisotope medical imaging.

Figure 9:
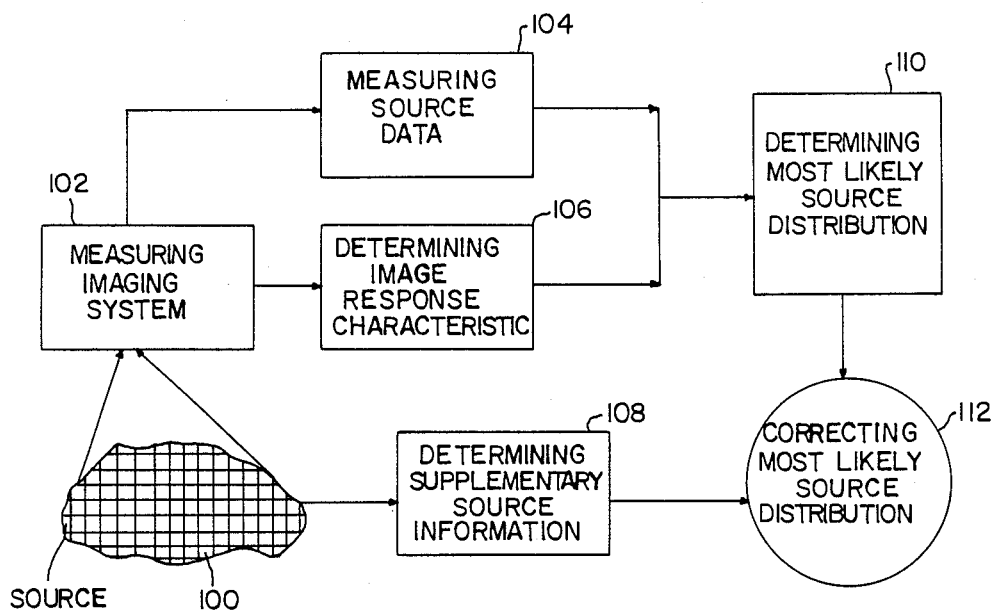
FIG. 9 is a block diagram depicting the arrangement according to the method of this invention.

In summary, with reference to FIG. 9, this invention resides, briefly stated, in a method of and an apparatus for acquiring and processing data arising from a source 100. In accordance with this invention, a measuring system 102 is used to obtain the source data 104. The response characteristics of the measuring system are also determined (see block 106). Supplementary source information concerning the source 100 is also determined (see block 108). The most likely source distribution which would give rise to the measured source data is algebraically specified (see block 110) using not only the measured source data and the response characteristics of the measuring system, as was done previously with prior art techniques, but also by using the supplementary source information 108. Finally, the most likely source distribution (see block 112) is calculated from the algebraic specification.

While the invention has been described in connection with a Bayesian image processing method and apparatus, it is not intended to be limited to the specific details shown, since various modifications may be made without departing in any way from the spirit of this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In an improved image processing method of processing data imaged from a source, comprising the steps of:
    (a) determining an image response characteristic of a measuring imaging system;
    (b) imaging a source having multiple source elements with the measuring imaging system, and obtaining measured source data having multiple measured data elements, each measured by a plurality of the source elements in accordance with the image response characteristic; and
    (c) determining a most likely source distribution which gives rise to the measured source data as a function of the measured data elements and the image response characteristic;
the improvement which comprises:
    (d) independently determining supplementary source information about the source from means other than from the measuring imaging system; and
    (e) correcting the most likely source distribution determined in step (c) by factoring in the independently determined supplementary source information, thereby more accurately specifying the most likely source distribution.

2. The method as recited in claim 1, wherein the supplementary source information is a source pattern or patterns whose possible presence at the source is under evaluation.

3. The method as recited in claim 1, wherein the supplementary source information consists of source probability functions in spatial, temporal and/or source strength variables.

4. In an improved image processing arrangement for processing data imaged from a source, comprising:
    (a) a measuring image system having an image response characteristic;
    (b) means for operating the system to image a source having multiple source elements, and to obtain measured source data having multiple measured data elements, each measured by a plurality of the source elements in accordance with the image response characteristic; and
    (c) means for determining a most likely source distribution which gives rise to the measured source data as a function of the measured data elements and the image response characteristic;
the improvement which comprises:
    (d) means for independently determining supplementary source information about the source from means other than from the measuring imaging system; and
    (e) means for correcting the most likely source distribution by factoring in the independently determined supplementary source information, thereby more accurately specifying the most likely source distribution.

* * * * *